United States Patent [19]

Ozoe et al.

[11] Patent Number: 5,512,647

[45] Date of Patent: Apr. 30, 1996

[54] COPOLYMER RUBBER AND METHOD FOR ITS PRODUCTION

[75] Inventors: Shinji Ozoe; Seiji Matsumoto, both of Shinnanyo; Kazumi Furuta, Kudamatsu, all of Japan

[73] Assignee: Tosoh Corporation, Yamaguchi, Japan

[21] Appl. No.: 251,264

[22] Filed: May 31, 1994

[51] Int. Cl.$^6$ .................. C08F 220/50; C08F 220/42; C08F 224/00; C08F 214/00; C08F 220/10; C08F 236/04

[52] U.S. Cl. .................. 526/298; 526/297; 526/273; 526/291; 526/328.5; 526/338

[58] Field of Search .................. 526/298, 273, 526/291, 297, 328.5, 338

[56] References Cited

U.S. PATENT DOCUMENTS

| | | | |
|---|---|---|---|
| 2,720,512 | 10/1955 | Butler | 525/328.2 |
| 2,828,295 | 3/1958 | Butler. | |
| 2,854,440 | 9/1958 | Kern. | |
| 4,333,963 | 6/1982 | Emmons et al. | 427/44 |
| 5,215,827 | 6/1993 | Dotzauer et al. | 428/500 |

FOREIGN PATENT DOCUMENTS 746914  3/1956  United Kingdom.

*Primary Examiner*—Joseph L. Schofer
*Assistant Examiner*—Wu C. Cheng
*Attorney, Agent, or Firm*—Sughrue, Mion, Zinn, Macpeak & Seas

[57] ABSTRACT

A copolymer rubber which consists essentially of (A) from 70 to 99 wt % of a cyano group-containing acrylate of the formula (I):

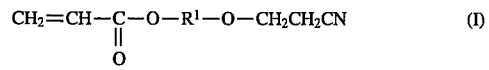

wherein $R^1$ is a $C_{2-6}$ alkylene group or $-CH_2CH_2OCH_2CH_2-$, (B) from 1 to 30 wt % of an α,β-unsaturated nitrile,

(C) from 0 to 10 wt % of at least one monomer selected from the following monomers:
  a) an active halogen group-containing monomer
  b) an epoxy group-containing monomer
  c) a carboxyl group-containing monomer
  d) a diene compound
  e) a (meth)acrylate having an ethylenically unsaturated bond in its side chain, and (D) from 0 to 15 wt % of other ethylenically unsaturated monomer which is copolymerizable with each of the above components (A), (B) and (C), and which has a Mooney viscosity ($ML_{1+4}$ (100° C.)) of at least 5.

16 Claims, 1 Drawing Sheet

FIGURE 1

COPOLYMER RUBBER AND METHOD FOR ITS PRODUCTION

The present invention relates to an oil resistant cold resistant copolymer rubber having improved fuel oil penetration resistance and mechanical strength.

Among environmental problems discussed on a global scale at present, the influence of automobiles is substantial. Therefore, strenuous efforts for developments are being made to improve the fuel costs for automobiles and to control exhaust gases. As a result, the interior of an engine room tends to be at a higher temperature, and a higher performance is required in the heat resistance and the ozone resistance of the rubber material to be used therein. Further, with respect to oil resistance, in the case of a hose for a fuel oil system as an example, the fuel oil penetration resistance is regarded to be of particular importance from the viewpoint of environmental problems.

At present, as rubber materials excellent in oil resistance, acrylic rubber, nitrile rubber, hydrogenated nitrile rubber, hydrin rubber and fluorine rubber are, for example, known. Among them, fluorine rubber is most excellent in oil resistance, fuel oil resistance and heat resistance, but it is poor in cold resistance and has a problem that it is extremely expensive. Other materials are substantially inferior to fluorine rubber in oil resistance, fuel oil resistance and heat resistance.

Further, polymers of cyano group-containing acrylates of the following formula (II) can be readily produced from relatively inexpensive materials, and they are known to be rubbers excellent in oil resistance and cold resistance (U.S. Pat. Nos. 2,687,402 and 2,720,512).

(II)

wherein $R^1$ is a $C_{2-4}$ alkylene group.

However, these polymers are hardly practically useful as their mechanical strength is very poor, although they are excellent in oil resistance and cold resistance.

In U.S. Pat. No. 2,839,511, it is disclosed that the mechanical strength can be improved by copolymerizing a small amount of an unsaturated carboxylic acid to the cyano group-containing acrylate of the formula (II). However, such a method has a problem that a very high temperature is required for vulcanization to obtain a satisfactory vulcanizate.

The present inventors have found that by copolymerizing a monomer having an active halogen group or an epoxy group as a crosslinkable site to a cyano group-containing acrylate of the formula (I), the resulting copolymer can readily be vulcanizable and makes an oil resistant and cold resistant rubber superior in oil resistance to nitrile rubber, hydrogenated nitrile rubber or hydrin rubber. However, the copolymer is inferior to fluorine rubber in fuel oil penetration resistance.

It is an object of the present invention to provide an oil resistant and cold and resistant copolymer rubber which has an excellent fuel oil penetration resistance comparable to fluorine rubber and which has improved mechanical strength.

The present inventors have found that a copolymer obtainable by copolymerizing not only a monomer having a functional group such as an active halogen group or an epoxy group as a crosslinkable site but also an α,β-unsaturated nitrile such as (meth)acrylonitrile to a cyano group-containing acrylate of the formula (I), is readily vulcanizable and makes an oil resistant and cold resistant rubber having improved fuel oil penetration resistance and mechanical strength. The present invention has been accomplished on the basis of this discovery.

Thus, the present invention provides a copolymer rubber which consists essentially of (A) from 70 to 99 wt % of a cyano group-containing acrylate of the formula (I):

(I)

wherein $R^1$ is a $C_{2-6}$ alkylene group or $-CH_2CH_2OCH_2CH_2-$, (B) from 1 to 30 wt % of an α,β-unsaturated nitrile,

(C) from 0 to 10 wt % of at least one monomer selected from the following monomers:
  a) an active halogen group-containing monomer
  b) an epoxy group-containing monomer
  c) a carboxyl group-containing monomer
  d) a diene compound
  e) a (meth)acrylate having an ethylenically unsaturated bond in its side chain, and (D) from 0 to 15 wt % of another ethylenically unsaturated monomer which is copolymerizable with each of the above components (A), (B) and (C), and which has a Mooney viscosity ($ML_{1+4}$ (100° C.)) of at least 5.

Further, the present invention provides a method for producing a copolymer rubber, which comprises copolymerizing in the presence of a radical initiator a monomer mixture consisting essentially of (A) from 70 to 99 wt % of a cyano group-containing acrylate of the formula (I):

(I)

wherein $R^1$ is a $C_{2-6}$ alkylene group or $-CH_2CH_2OCH_2CH_2-$, (B) from 1 to 30 wt % of an α,β-unsaturated nitrile, (C) from 0 to 10 wt % of at least one monomer selected from the following monomers:

a) an active halogen group-containing monomer b) an epoxy group-containing monomer c) a carboxyl group-containing monomer d) a diene compound e) A (meth)acrylate having an ethylenically unsaturated bond in its side chain, and (D) from 0 to 15 wt % of another ethylenically unsaturated monomer which is copolymerizable with each of the above components (A), (B) and (C).

In the accompanying drawing.

Now, the present invention will be described in detail with reference to the preferred embodiments.

The component (A) in the above copolymer rubber is a cyano group-containing acrylate of the formula (I). It may, for example, be 2-(2-cyanoethoxy)ethyl acrylate, 3-(2-cyanoethoxy)propyl acrylate, 4-(2-cyanoethoxy)butyl acrylate, 5-(2-cyanoethoxy)pentyl acrylate, 6-(2-cyanoethoxy)hexyl acrylate or 2-[2-(2-cyanoethoxy)ethoxy]ethyl acrylate.

The component (B) in the above copolymer rubber is an α,β-unsaturated nitrile, which may, for example, be acrylonitrile, methacrylonitrile, ethacrylonitrile or α-chloroacrylonitrile. Preferred is acrylonitrile or methacrylonitrile. Acrylonitrile is particularly preferred.

Of the component (C) of the above copolymer rubber, the active halogen group-containing monomer may, for example, be vinyl chloroacetate, vinyl chloropropionate, allyl chloroacetate, allyl chloropropionate, 2-chloroethyl vinyl ether, chloromethylstyrene, 2-chloroethyl acrylate, chloromethyl vinyl ketone, 2-chloroacetoxymethyl-5-norbornene or a reaction product of chloroacetic acid with an unsaturated glycidyl compound. However, vinyl chloroacetate, 2-chloroethyl vinyl ether or 2-chloroethyl acrylate is particularly preferred.

Of the compound (C) of the above copolymer rubber, the epoxy group-containing monomer may, for example, be glycidyl methacrylate, glycidyl acrylate, allyl glycidyl ether or vinyl glycidyl ether. However, glycidyl methacrylate, glycidyl acrylate or allyl glycidyl ether is particularly preferred.

Of the component (C) of the above copolymer rubber, the carboxyl group-containing monomer may, for example, be an unsaturated carboxylic acid such as acrylic acid or methacrylic acid, or a monoalkyl ester of an unsaturated dicarboxylic acid such as maleic acid, phthalic acid or itaconic acid.

The diene compound of the component (C) of the above copolymer rubber may, for example, be a non-conjugated diene such as an alkylidenenorbornene, an alkenylnorbornene, dicyclopentadiene, methylcyclopentadiene or a dimer thereof, or a conjugated diene such as butadiene or isoprene. However, preferred is an alkylidenenorbornene such as ethylidenenorbornene.

Of the component (C) of the above copolymer rubber, the (meth)acrylate having an ethylenically unsaturated bond in its side chain may, for example, be dihydrodicyclopentadienyl (meth)acrylate, dihydrodicyclopentadienyloxyethyl (meth)acrylate, tetrahydrobenzyl (meth)acrylate or an alkylidenenorbornyl (meth)acrylate.

As the component (D) of the above copolymer rubber, a (meth)acrylate such as ethyl (meth)acrylate, butyl (meth)acrylate, methoxyethyl acrylate or butoxyethyl acrylate, a vinylamide such as (meth)acrylamide, N-methylol (meth)acrylamide or an N-alkoxy(meth)acrylamide, an aromatic vinyl compound such as styrene, methylstyrene or chlorostyrene, vinyl chloride or vinylidene chloride, may, for example, be used as a copolymerizable component, as the case requires.

The proportions of the components (A), (B), (C) and (D) in the copolymer rubber of the present invention are from 70 to 99 wt % of the component (A), from 1 to 30 wt % of the component (B), from 0 to 10 wt % of the component (C) and from 0 to 15 wt % of the component (D).

If the above component (A) is less than 70 wt %, the cold resistance tends to be impaired, such being undesirable.

If the above component (B) exceeds 30 wt %, the cold resistance tends to deteriorate although the fuel oil penetration resistance and the mechanical strength may be improved. If it is less than 1 wt %, the fuel oil penetration resistance and the mechanical strength tend to deteriorate, such being undesirable. The component (B) is preferably from 7 to 14 wt %.

If the above component (C) is less than 0.5 wt %, no adequate vulcanization can be carried out. On the other hand, if it exceeds 10 wt %, vulcanization tends to proceed excessively, whereby it tends to be difficult to obtain a satisfactory vulcanizate. The component (C) is preferably from 0.5 to 5 wt %. However, even if the component (C) is less than 0.5 wt %, it is possible to conduct vulcanization by means of an organic peroxide.

The above component (D) may be used as the case requires for the purpose of improving the heat resistance or processability to such an extent not to impair the fuel oil resistance and the cold resistance which are features of the copolymer of the present invention. Its amount is less than 15 wt % at the maximum, and it is preferably at most 10 wt %.

The copolymer rubber of the present invention can be prepared by subjecting a mixture of the above monomer components (A), (B), (C) and (D) to radical polymerization in the presence of a radical initiator such as an inorganic or organic peroxide, an azo compound or a redox initiator. The polymerization method may be a conventional method such as bulk polymerization, solution polymerization, suspension polymerization or emulsion polymerization. However, emulsion polymerization is particularly preferred.

For example, in the case of emulsion polymerization, the copolymer rubber of the present invention can be prepared by the following method.

A mixture of the above monomer components (A), (B), (C) and (D) is mixed, if necessary together with a molecular weight controlling agent, with an aqueous emulsifier solution for emulsification. To this emulsion, an initiator is added to carry out the polymerization to obtain a latex of the copolymer rubber. As the molecular weight controlling agent, an alkyl mercaptan such as n-dodecylmercaptan, tert-dodecylmercaptan or octylmercaptan, may usually be employed.

As the emulsifier, an anionic emulsifier such as an alkali metal alkylsulfate, an alkali metal alkylbenzenesulfonate, an alkali metal polyoxyethylenealkylphenyl ether sulfate or an alkali metal polyoxyethylenealkylphenyl ether phosphate, or a nonionic emulsifier such as polyoxyethylenealkyl ether or polyoxyethylenealkylphenyl ether, may be used.

As the initiator, potassium persulfate, ammonium persulfate, an inorganic or organic peroxide such as paramethane hydroperoxide, cumene hydroperoxide or tert-butylhydroperoxide, or a redox system which is a combination of the above peroxide and a reducing agent such as ferrous sulfate, may be used.

The polymerization is conducted usually at a temperature of from 0° to 80° C., preferably from 5° to 60° C. In a case where heat generation is substantial and it is difficult to control the temperature during the polymerization, the polymerization may be conducted while adding the monomer mixture in small portions or continuously to the aqueous emulsifier solution. After completion of the polymerization, the emulsion is put into an aqueous solution of an inorganic salt such as sodium chloride, calcium chloride or magnesium chloride to precipitate the polymer, followed by washing with water and drying to obtain the desired copolymer rubber.

The copolymer rubber of the present invention can be vulcanized in the same manner as a commonly known acrylic rubber. The vulcanization of the copolymer rubber of the present invention is conducted by using a vulcanizer selected depending upon the type of the monomer component (C), if necessary, with an addition of a vulcanization accelerator, a reinforcing agent, a filler, a plasticizer, an age preventing agent or a stabilizer. For example, as a vulcanizer to be used in a case where the copolymer rubber contains an active halogen group-containing monomer, a polyamine, a polyamine salt, a combination of a metal soap with sulfur or with a sulfur-donative compound, an organic ammonium carboxylate, or a combination of a triazine derivative such as trimercaptotriazine or dimercaptotriazine with a metal oxide or a dithiocarbamic acid salt or/and a metal salt, may be employed.

As a vulcanizer to be used in a case where the copolymer rubber contains an epoxy group-containing monomer, a polyamine, a polyamine salt, a dithiocarbamic acid salt, a thiocyanic acid salt, an organic ammonium carboxylate, a combination of a metal salt with sulfur or a sulfur donative compound, a combination of a polycarboxy compound or a carboxylic anhydride with a quaternary ammonium salt or a quaternary phosphonium salt, a combination of an imidazole compound with an alkylsulfate, a combination of guanidine or a guanidine derivative with sulfur or a sulfur donative compound, or a combination of an alkyltrimethylammonium salt with isocyanuric acid, may, for example, be mentioned.

As a vulcanizer to be used in a case where the copolymer rubber contains a carboxyl group-containing monomer as the component (C), a combination of a polyepoxy compound with a quaternary ammonium salt or/and quaternary phosphonium salt, may, for example, be mentioned.

As a vulcanizer to be used in a case where the copolymer rubber contains a diene compound and/or a (meth)acrylate having an unsaturated bond in its side chain as the component (C), sulfur, a thiuram compound or an organic peroxide may, for example, be mentioned.

In a case where the component (C) in the copolymer rubber is less than 0.5 wt % or in a case where the diene compound or/and the (meth)acrylate having an unsaturated bond in its side chain as the component (C) is contained in an amount of at least 0.5 wt %, an organic peroxide may be used as the vulcanizer. The organic peroxide may be any organic peroxide which is commonly used for vulcanization of acrylic rubber and other rubbers. Specifically, it may, for example, be methylcumene ketone peroxide, cumene hydroperoxide, di-t-butylcumyl peroxide, dicumyl peroxide, 2,5-dimethyl-2,5-di(t-butylperoxy)hexane, 2,5-dimethyl-2,5-di(t-butylperoxy)hexyne, 1,3-bis(t-butylperoxyisopropyl)benzene, 1,1-bis(t-butylperoxy)-3,3,5-trimethylcyclohexane, benzoyl peroxide, t-butyl peroxybenzoate, or t-butyl peroxyisopropylcarbonate. The amount of the organic peroxide to be incorporated is usually from 0.01 to 10 parts by weight. If the amount is less than 0.01 part by weight, no adequate rubber elasticity tends to be obtained. On the other hand, if it exceeds 10 parts by weight, the crosslinking density tends to be too high. The amount is preferably from 0.5 to 5 parts by weight.

In the vulcanization by means of an organic peroxide, to increase the crosslinking efficiency, a crosslinking assistant or a co-crosslinking agent such as an unsaturated polyfunctional compound may also be used, as the case requires. It may, for example, be paraquinonedioxime, ethylene glycol dimethacrylate, triethylene glycol dimethacrylate, trimethylolpropane trimethacrylate, diallyl phthalate, triallyl cyanurate, triallyl isocyanurate, N,N-m-phenylenebismaleimide or divinyl benzene. The amount of such a co-crosslinking agent is usually from 1 to 10 parts by weight, preferably from 2 to 5 parts by weight, per 100 parts by weight of the copolymer rubber. If the amount of the co-crosslinking agent exceeds 10 parts by weight or is less than 1 part by weight, the crosslinking efficiency tends to be low.

By the vulcanization of the copolymer rubber of the present invention, it is possible to obtain a vulcanizate excellent in the mechanical strength, oil resistance, and cold resistance, which is useful for various applications in which high oil resistance is required, including fuel hoses or sealing materials for automobiles.

Now, the present invention will be described in further detail with reference to Examples. However, it should be understood that the present invention is by no means restricted to such specific Examples.

Figure 1:
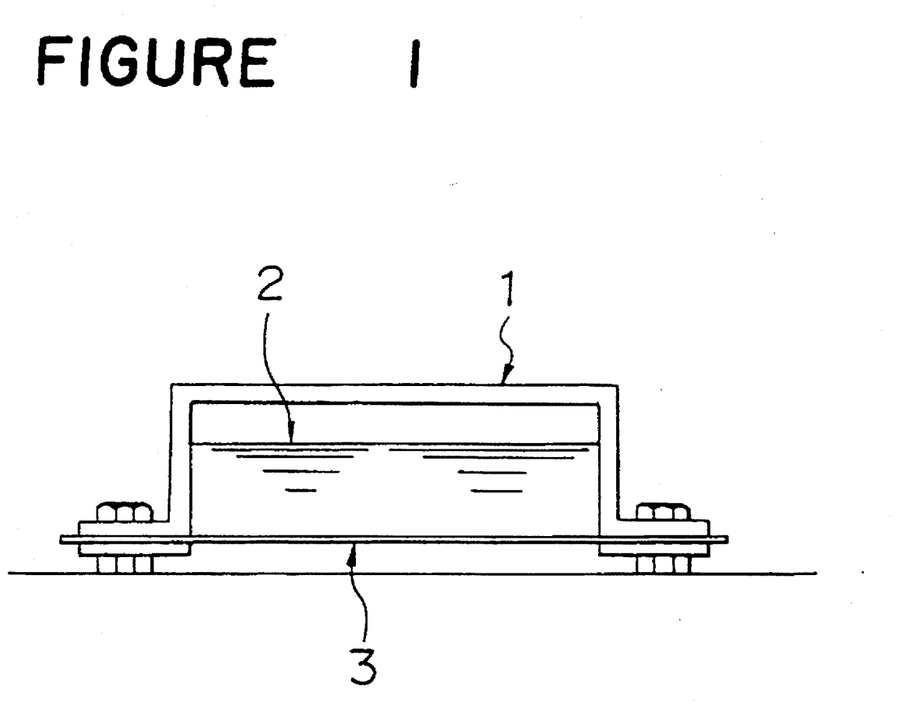
FIG. 1 is a schematic view illustrating the fuel oil penetration test conducted in Examples 1 to 31 and Comparative Examples 1 to 5 of the present invention.

In the following description, "parts" means "parts by weight". The composition of each copolymer rubber was determined by an elemental analysis, quantitative analyses of nitrogen, carbon, hydrogen and chlorine in the copolymer by an oxygen flask combustion method, an epoxy equivalent measured in accordance with JIS K7236 and a quantitative analysis of a double bond by an iodine value titration method. The Mooney viscosity was measured in accordance with JIS K6300, and the physical properties of vulcanized rubber were measured in accordance with JIS K6301. The fuel oil resistance was evaluated by immersing the vulcanized rubber in fuel oil C at 50° C. for 3 days and then measuring the volume change. A fuel oil penetration test was conducted by a method shown in FIG. 1. Namely, about 300 g of fuel oil C 2 was accurately weighed and put into an aluminum container 1, and then immediately sealed with a vulcanized rubber sheet 3 having a thickness of 1 mm. The assembly was left to stand still at 25° C. for 9 days under the condition as shown in FIG. 1, whereupon the weight change was measured, and the penetrated amount of fuel oil C (the penetrated amount per 100 $cm^2$ of the rubber sheet in contact with fuel oil C) was calculated. Using a non-vulcanized rubber as the test sample, the glass transition temperature was measured by a differential scanning calorimeter (DSC) at a temperature raising rate of 10° C. per minute. For the analysis of the composition and the measurement by DSC, the copolymer rubber salted out and dried, was purified by reprecipitation in acetone/methanol and acetone/pure water for use as the test sample.

EXAMPLE 1

An aqueous emulsifier solution comprising 4 parts of polyoxyethylenesorbitan monolaurate, 2 parts of sodium laurylsulfate, 0.7 part of disodiumhydrogen phosphate, 0.3 part of sodiumdihydrogen phosphate and 200 parts of distilled water, was maintained at 15° C. and thoroughly flushed with nitrogen. Then, 0.005 part of sodium iron (II) ethylenediamine tetraacetate, 0.02 part of tetrasodium ethylenediamine tetraacetate, 0.02 part of rongalit and 0.02 part of sodium hydrosulfite were added thereto. Then, a mixture comprising 100 parts of a monomer mixture having the composition as identified in Table 1, which was preliminarily thoroughly flushed with nitrogen, and 0.026 part of n-dodecylmercaptan, was continuously added thereto over a period of 3 hours. At the same time, an aqueous solution containing 0.12 wt % of tert-butylhydroperoxide was dropwise added at a rate of 1.6 parts per minute to conduct the polymerization. The monomer mixture was entirely added, and the polymerization was further continued for 3 hours. Then, 0.2 part of 2,2-methylenebis-(4-methyl-6-tert-butyphenol) was added to terminate the polymerization. The conversion of monomers calculated from the solid content of the latex was 97%. The obtained polymer latex was put into a 1% calcium chloride aqueous solution at 85° C. to isolate the polymer, which was thoroughly washed and then dried at 90° C. for 4 hours to obtain a polymer having a Mooney viscosity $ML_{1+4}$ (100° C.) of crude rubber of 26. As shown in Comparative Example 1, with a homopolymer of 4-(2-cyanoethoxy)butyl acrylate having a low glass transition point, it is difficult to increase the Mooney viscosity $ML_{1+4}$ (100° C.) of crude rubber to a level of 26.

The polymer obtained in this Example is soluble in acetone, while the homopolymer of acrylonitrile is insoluble in acetone, and a single glass transition point was observed at −35.4° C. by the measurement by DSC. This is apparently different from the transition point of 120° C. corresponding to the homopolymer of acrylonitrile or −46.0° C. corresponding to the homopolymer of 4-(2-cyanoethoxy)butyl acrylate. From these results as well as from the result of the analysis of the composition of the polymer, it is apparent that the polymer obtained in this Example is a random copolymer consisting of 87.1 wt % of 4-(2-cyanoethoxy)butyl acrylate, 12.1 wt % of acrylonitrile and 0.8 wt % of vinyl chloroacetate, as shown in Table 1.

The obtained copolymer rubber was blended to have a composition as identified in Table 6, and the blend was kneaded by rolls, followed by press vulcanization at 170° C. for 20 minutes to obtain a vulcanized rubber sheet. This sheet was further subjected to post vulcanization in a Geer oven at 150° C. for 4 hours, and then evaluation was conducted. Table 1 shows the results of evaluation of the physical properties.

EXAMPLES 2, 3 and 20

Monomer mixtures having the compositions as identified in Tables 1 and 3 were copolymerized in the same manner as in Example 1 to obtain polymers at conversions of from 96 to 98%. With respect to these polymers, the measurement by DSC was conducted, whereby they showed single glass transition temperatures which were totally different from those of homopolymers of the constituting monomers. In addition, from the results of the analyses of their compositions, these polymers were found to be random copolymers having the compositions as identified in Tables 1 and 3.

The obtained copolymer rubbers were vulcanized and evaluated in the same manner as in Example 1. Tables 1 and 3 show the results of evaluation of the physical properties.

EXAMPLES 4 to 10

Monomer mixtures having the compositions as identified in Tables 1 and 2 were copolymerized in the same manner as in Example 1 to obtain polymers at conversions of from 96 to 98%. With respect to these polymers, the measurement by DSC was conducted, whereby they showed single glass transition temperatures which were totally different from those of homopolymers of the constituting monomers. In addition, from the results of the analyses of their compositions, these polymers were found to be random copolymers having the compositions as shown in Tables 1 and 2.

The obtained copolymer rubbers were blended to have a composition as shown in Table 7, and the blends were kneaded by rolls, followed by press vulcanization at 170° C. for 20 minutes to obtain vulcanized rubber sheets. Further, they were subjected to post vulcanization in a Geer oven at 150° C. for 4 hours, and then evaluation was conducted. Tables 1 and 2 show the results of evaluation of the physical properties.

EXAMPLES 11 to 15

Monomer mixtures having the compositions as identified in Tables 2 and 3 were copolymerized in the same manner as in Example 1 to obtain polymers at conversions of from 96 to 98%. With respect to these polymers, the measurement by DSC was conducted, whereby they showed single glass transition temperatures which were totally different from those of homopolymers of the constituting monomers. In addition, from the results of analyses of their compositions, these polymers were found to be random copolymers having the compositions as identified in Tables 2 and 3.

The obtained copolymer rubbers were blended to have a composition as identified in Table 8, and the blends were kneaded by rolls, followed by press vulcanization at 170° C. for 20 minutes to obtain vulcanized rubber sheets. These sheets were further subjected to post-vulcanization in a Geer oven at 150° C. for 4 hours, and then evaluation was conducted. Tables 2 and 3 show the results of evaluation of the physical properties.

EXAMPLES 16 and 17

Monomer mixtures having the compositions as identified in Table 3 were copolymerized in the same manner as in Example 1 except that n-dodecylmercaptan was not used, to obtain polymers at a conversion of 96%. With respect to these monomers, the measurement by DSC was conducted, whereby they showed single glass transition temperatures which were totally different from those of the homopolymers of the constituting monomers. In addition, from the results of analyses of their compositions, these polymers were found to be random copolymers having the compositions as identified in Table 3.

The obtained copolymer rubbers were vulcanized and evaluated in the same manner as in Examples 11 to 15. The results are shown in Table 3.

EXAMPLES 18 and 19

Monomer mixtures having the compositions as identified in Table 3 were polymerized in the same manner as in Example 1 except that an aqueous emulsifier solution comprising 4 parts of sodium polyoxyethylenenonylphenyl ether sulfate, 0.87 part of disodiumhydrogen phosphate, 0.13 part of sodiumdihydrogen phosphate and 200 parts of distilled water, was maintained at 15° C. and flushed thoroughly with nitrogen, and then 0.07 part of ferrous sulfate and 0.14 part of trisodium ethylenediamine tetraacetate were added thereto, to obtain polymers at conversions of from 96 to 98%. With respect to these polymers, the measurement by DSC was conducted, whereby they showed single glass transition temperatures which were totally different from those of the homopolymers of the constituting monomers. In addition, from the results of analyses of their compositions, these polymers were found to be random copolymers having the compositions as identified in Table 3.

The obtained copolymer rubbers were blended to have a composition as identified in Table 8 and kneaded by rolls, followed by press vulcanization at 150° C. for 20 minutes to obtain vulcanized rubber sheets. They were further subjected to post vulcanization in a Geer oven at 150° C. for 4 hours, and then evaluation was conducted. Table 3 shows the results of evaluation of the physical properties.

EXAMPLES 21 to 25

Monomer mixtures having the compositions as identified in Table 4 were copolymerized in the same manner as in Examples 18 and 19 except that 0.7 part of disodiumhydrogen phosphate and 0.3 part of sodiumdihydrogen phosphate were used, to obtain polymers at conversions of from 96 to 98%. With respect to these polymers, the measurement by DSC was conducted, whereby they showed single glass transition temperatures which were totally different from those of the homopolymers of the constituting monomers. In addition, from the results of analyses of their compositions, these polymers were found to be random copolymers having the compositions as identified in Table 4.

The obtained copolymer rubbers were blended to have a composition as identified in Table 9 and kneaded by rolls, followed by press vulcanization at 150° C. for 10 minutes to obtain vulcanized rubber sheets. These sheets were further subjected to post vulcanization in a Geer oven at 150° C. for 4 hours, and then evaluation was conducted. Table 4 shows the results of evaluation of the physical properties.

EXAMPLES 26 to 31

Monomer mixtures having the compositions as identified in Table 5 were polymerized in the same manner as in Examples 21 to 25, to obtain polymers at conversions of from 96 to 99%. With respect to these polymers, the measurement by DSC was conducted, whereby they showed single glass transition temperatures which were totally different from those of the homopolymers of the constituting monomers. In addition, from the results of analyses of their compositions, these polymers were found to be random copolymers having the compositions as identified in Table 5.

The obtained copolymer rubbers were blended to have a composition as identified in Table 10 and kneaded by rolls, followed by press vulcanization at 170° C. for 20 minutes to obtain vulcanized rubber sheets. These sheets were further subjected to post vulcanization in a Geer oven at 150° C. for 4 hours, and then evaluation was conducted. Table 5 shows the results of evaluation of the physical properties.

Comparative Example 1

A monomer mixture having the composition as identified in Table 4 was copolymerized in the same manner as in Example 1 except that the concentration of the aqueous tert-butylhydroperoxide solution was 0.025 wt %, the amount of n-dodecylmercaptan was 0.019 part and the time for the post polymerization was one hour, to obtain a polymer at conversion of 98%. This polymer had a Mooney viscosity $ML_{1+4}$ (100° C.) of crude rubber of 9 and had a glass transition point at −46.0° C. as measured by DSC. Further, from the results of the elemental analysis, it was found to be a copolymer having the composition identified in Table 4.

The obtained rubber was vulcanized and evaluated in the same manner as in Example 1. The results are shown in Table 4.

Comparative Examples 2 to 5

Using various rubbers as identified in Table 11, vulcanized rubber sheets were prepared in accordance with the blending and vulcanization conditions as identified in Table 11, and evaluation of their physical properties was conducted.

TABLE 1

|  | Example 1 | Example 2 | Example 3 | Example 4 | Example 5 | Example 6 | Example 7 |
|---|---|---|---|---|---|---|---|
| Monomer composition (wt %) | | | | | | | |
| 4-(2-Cyanoethoxy)butyl acrylate | 86.0 | — | — | 85.0 | 86.0 | 84.2 | — |
| 3-(2-Cyanoethoxy)propyl acrylate | — | 86.0 | — | — | — | — | 84.2 |
| 2-[2-(2-Cyanoethoxy)ethoxy]ethyl acrylate | — | — | 82.9 | — | — | — | — |
| Acrylonitrile | 12.0 | 12.0 | 15.0 | 12.0 | 12.0 | — | 11.8 |
| Methacrylonitrile | — | — | — | — | — | 11.8 | — |
| Vinyl chloroacetate | 2.0 | 2.0 | 2.1 | — | — | — | — |
| 2-Chloroethyl vinyl ether | — | — | — | 3.0 | — | 4.0 | 4.0 |
| 2-Chloroethyl acrylate | — | — | — | — | 2.0 | — | — |
| Copolymer composition (wt %) | | | | | | | |
| 4-(2-Cyanoethoxy)butyl acrylate | 87.1 | — | — | 85.8 | 86.4 | 85.5 | — |
| 3-(2-Cyanoethoxy)propyl acrylate | — | 87.2 | — | — | — | — | 86.0 |
| 2-[2-(2-Cyanoethoxy)ethoxy]ethyl acrylate | — | — | 84.3 | — | — | — | — |
| Acrylonitrile | 12.1 | 11.8 | 14.8 | 12.1 | 11.8 | — | 11.7 |
| Methacrylonitrile | — | — | — | — | — | 11.9 | — |
| Vinyl chloroacetate | 0.8 | 1.0 | 0.9 | — | — | — | — |
| 2-Chloroethyl vinyl ether | — | — | — | 2.1 | — | 2.6 | 2.3 |
| 2-Chloroethyl acrylate | — | — | — | — | 1.8 | — | — |
| Mooney viscosity $ML_{1+4}$ (100° C.) | 26 | 29 | 27 | 25 | 26 | 25 | 26 |
| Evaluation results | | | | | | | |
| Physical properties of vulcanized rubber | | | | | | | |
| Hardness (JIS-A) | 58 | 57 | 59 | 57 | 58 | 56 | 59 |
| Tensile strength (kg/cm$^2$) | 134 | 135 | 127 | 130 | 129 | 122 | 144 |
| Breaking elongation (%) | 260 | 210 | 250 | 240 | 260 | 210 | 230 |
| 100% modulus (kg/cm$^2$) | 58 | 56 | 59 | 44 | 51 | 48 | 61 |
| Fuel oil C resistance | | | | | | | |
| Volume increase (%) | 16 | 12 | 13 | 15 | 16 | 16 | 13 |
| Penetrated amount (g/100 cm$^2$ · 9 days) | 1.9 | 1.6 | 1.7 | 1.9 | 1.8 | 1.9 | 1.7 |
| Cold resistance | | | | | | | |
| Glass transition temp. (°C.) | −35.5 | −30.2 | −35.7 | −35.0 | −35.4 | −34.2 | −30.6 |

TABLE 2

|  | Example 8 | Example 9 | Example 10 | Example 11 | Example 12 | Example 13 | Example 14 |
|---|---|---|---|---|---|---|---|
| Monomer composition (wt %) | | | | | | | |
| 4-(2-Cyanoethoxy)butyl acrylate | — | — | — | 87.0 | — | 86.5 | — |
| 3-(2-Cyanoethoxy)propyl acrylate | 86.0 | — | — | — | — | — | 86.5 |
| 2-[2-(2-Cyanoethoxy)ethoxy]ethyl acrylate | — | 84.7 | 84.5 | — | 84.0 | — | — |
| Acrylonitrile | — | 11.8 | — | 12.0 | 15.0 | — | 12.0 |
| Methacrylonitrile | 12.0 | — | 13.5 | — | — | 12.0 | — |
| 2-Chloroethyl vinyl ether | — | 3.5 | — | — | — | — | — |
| 2-Chloroethyl acrylate | 2.0 | — | 2.0 | — | — | — | — |
| Glycidyl methacrylate | — | — | — | 1.0 | 1.0 | — | — |
| Glycidyl acrylate | — | — | — | — | — | 1.5 | 1.5 |
| Copolymer composition (wt %) | | | | | | | |
| 4-(2-Cyanoethoxy)butyl acrylate | — | — | — | 87.0 | — | 86.8 | — |
| 3-(2-Cyanoethoxy)propyl acrylate | 86.2 | — | — | — | — | — | 86.8 |
| 2-[2-(2-Cyanoethoxy)ethoxy]ethyl acrylate | — | 85.7 | 85.7 | — | 84.5 | — | — |
| Acrylonitrile | — | 12.0 | — | 12.2 | 14.7 | — | 12.0 |
| Methacrylonitrile | 12.2 | — | 12.6 | — | — | 11.8 | — |
| 2-Chloroethyl vinyl ether | — | 2.3 | — | — | — | — | — |
| 2-Chloroethyl acrylate | 1.6 | — | 1.7 | — | — | — | — |
| Glycidyl methacrylate | — | — | — | 0.8 | 0.8 | — | — |
| Glycidyl acrylate | — | — | — | — | — | 1.4 | 1.2 |
| Mooney viscosity $ML_{1+4}$ (100° C.) | 28 | 26 | 26 | 26 | 27 | 26 | 28 |
| Evaluation results | | | | | | | |
| Physical properties of vulcanized rubber | | | | | | | |
| Hardness (JIS-A) | 58 | 58 | 55 | 57 | 55 | 57 | 55 |
| Tensile strength (kg/cm$^2$) | 145 | 122 | 124 | 132 | 125 | 134 | 140 |
| Breaking elongation (%) | 220 | 230 | 240 | 250 | 240 | 240 | 235 |
| 100% modulus (kg/cm$^2$) | 59 | 57 | 55 | 44 | 42 | 56 | 59 |
| Fuel oil C resistance | | | | | | | |
| Volume increase (%) | 12 | 14 | 14 | 15 | 13 | 16 | 12 |
| Penetrated amount (g/100 cm$^2$ · 9 days) | 1.6 | 1.8 | 1.6 | 1.9 | 1.8 | 1.8 | 1.6 |
| Cold resistance | | | | | | | |
| Glass transition temp. (°C.) | −30.2 | −35.5 | −36.5 | −35.2 | −35.6 | −35.7 | −30.2 |

TABLE 3

|  | Example 15 | Example 16 | Example 17 | Example 18 | Example 19 | Example 20 |
|---|---|---|---|---|---|---|
| Monomer composition (wt %) | | | | | | |
| 4-(2-Cyanoethoxy)butyl acrylate | 86.5 | — | — | 86.5 | — | — |
| 3-(2-Cyanoethoxy)propyl acrylate | — | 84.0 | — | — | 86.0 | — |
| 2-[2-(2-Cyanoethoxy)ethoxy]ethyl acrylate | — | — | 84.2 | — | — | — |
| 6-(2-Cyanoethoxy)hexyl acrylate | — | — | — | — | — | 83.5 |
| Acrylonitrile | 12.0 | 12.0 | 11.8 | — | 12.0 | 15.0 |
| Methacrylonitrile | — | — | — | 12.0 | — | — |
| Vinyl chloroacetate | — | — | — | — | — | 1.5 |
| Glycidyl methacrylate | — | — | — | 1.0 | 1.5 | — |
| Glycidyl acrylate | 1.5 | — | — | — | — | — |
| Acryl glycidyl ether | — | 4.0 | 4.0 | — | — | — |
| Methacrylic acid | — | — | — | 0.5 | 0.5 | — |
| Copolymer composition (wt %) | | | | | | |
| 4-(2-Cyanoethoxy)butyl acrylate | 87.0 | — | — | 86.8 | — | — |
| 3-(2-Cyanoethoxy)propyl acrylate | — | 87.3 | — | — | 86.4 | — |
| 2-[2-(2-Cyanoethoxy)ethoxy]ethyl acrylate | — | — | 86.4 | — | — | — |
| 6-(2-Cyanoethoxy)hexyl acrylate | — | — | — | — | — | 83.7 |
| Acrylonitrile | 11.8 | 12.0 | 12.0 | — | 12.5 | 15.6 |
| Methacrylonitrile | — | — | — | 12.2 | — | — |
| Vinyl chloroacetate | — | — | — | — | — | 0.7 |
| Glycidyl methacrylate | — | — | — | 0.7 | 0.8 | — |
| Glycidyl acrylate | 1.1 | — | — | — | — | — |
| Acryl glycidyl ether | — | 0.7 | 1.6 | — | — | — |
| Methacrylic acid | — | — | — | 0.3 | 0.3 | — |
| Mooney viscosity $ML_{1+4}$ (100° C.) | 27 | 30 | 27 | 26 | 27 | 26 |
| Evaluation results | | | | | | |
| Physical properties of vulcanized rubber | | | | | | |
| Hardness (JIS-A) | 61 | 55 | 59 | 57 | 28 | 57 |
| Tensile strength (kg/cm$^2$) | 140 | 132 | 137 | 145 | 128 | 129 |
| Breaking elongation (%) | 250 | 260 | 250 | 190 | 270 | 240 |
| 100% modulus (kg/cm$^2$) | 60 | 40 | 59 | 60 | 42 | 55 |

TABLE 3-continued

|  | Example 15 | Example 16 | Example 17 | Example 18 | Example 19 | Example 20 |
|---|---|---|---|---|---|---|
| Fuel oil C resistance | | | | | | |
| Volume increase (%) | 15 | 12 | 13 | 15 | 12 | 18 |
| Penetrated amount (g/100 cm² · 9 days) | 1.8 | 1.6 | 1.7 | 1.9 | 1.8 | 2.4 |
| Cold resistance | | | | | | |
| Glass transition temp. (°C.) | −36.2 | −30.5 | −36.0 | −35.2 | −30.3 | −36.2 |

TABLE 4

|  | Example 21 | Example 22 | Example 23 | Example 24 | Example 25 | Comp. Example 1 |
|---|---|---|---|---|---|---|
| Monomer composition (wt %) | | | | | | |
| 4-(2-Cyanoethoxy)butyl acrylate | 86.5 | 86.5 | 85.0 | 85.0 | 85.5 | 98.8 |
| Acrylonitrile | — | 12.0 | 12.0 | — | 12.0 | — |
| Methacrylonitrile | 12.0 | — | — | 12.0 | — | — |
| Vinyl chloroacetate | — | — | — | — | — | 1.2 |
| Ethylidenenorbornene | — | — | — | — | 2.5 | — |
| Dihydrodicyclopentenyl acrylate | 1.5 | 1.5 | — | — | — | — |
| Dihydrodicyclopentenyloxyethyl acrylate | — | — | — | 3.0 | — | — |
| Tetrahydrobenzyl acrylate | — | — | 3.0 | — | — | — |
| Copolymer composition (wt %) | | | | | | |
| 4-(2-Cyanoethoxy)butyl acrylate | 87.0 | 87.0 | 86.3 | 86.5 | 86.6 | 99.3 |
| Acrylonitrile | — | 12.1 | 12.0 | — | 12.1 | — |
| Methacrylonitrile | 12.2 | — | — | 12.2 | — | — |
| Vinyl chloroacetate | — | — | — | — | — | 0.7 |
| Ethylidenenorbornene | — | — | — | — | 1.3 | — |
| Dihydrodicyclopentenyl acrylate | 0.8 | 0.9 | — | — | — | — |
| Dihydrodicyclopentenyloxyethyl acrylate | — | — | — | 1.3 | — | — |
| Tetrahydrobenzyl acrylate | — | — | 1.7 | — | — | — |
| Mooney viscosity $ML_{1+4}$ (100° C.) | 26 | 26 | 26 | 26 | 27 | 26 |
| Evaluation results | | | | | | |
| Physical properties of vulcanized rubber | | | | | | |
| Hardness (JIS-A) | 57 | 57 | 55 | 57 | 58 | 57 |
| Tensile strength (kg/cm²) | 120 | 121 | 124 | 121 | 110 | 98 |
| Breaking elongation (%) | 260 | 260 | 210 | 250 | 270 | 250 |
| 100% modulus (kg/cm²) | 40 | 42 | 55 | 44 | 42 | 44 |
| Fuel oil C resistance | | | | | | |
| Volume increase (%) | 15 | 15 | 14 | 15 | 16 | 20 |
| Penetrated amount (g/100 cm² · 9 days) | 1.9 | 1.8 | 1.6 | 1.9 | 1.8 | 4.6 |
| Cold resistance | | | | | | |
| Glass transition temp. (°C.) | −36.5 | −35.9 | −36.5 | −35.2 | −35.9 | −46.0 |

TABLE 5

|  | Example 26 | Example 27 | Example 28 | Example 29 | Example 31 | Example 31 |
|---|---|---|---|---|---|---|
| Monomer composition (wt %) | | | | | | |
| 4-(2-Cyanoethoxy)butyl acrylate | 88.0 | 88.0 | — | — | — | — |
| 3-(2-Cyanoethoxy)propyl acrylate | — | — | 88.0 | 88.0 | — | — |
| 2-[2-(2-Cyanoethoxy)ethoxy]ethyl acrylate | — | — | — | — | 88.0 | 88.0 |
| Acrylonitrile | 12.0 | — | 12.0 | — | 12.0 | — |
| Methacrylonitrile | — | 12.0 | — | 12.0 | — | 12.0 |
| Copolymer composition (wt %) | | | | | | |
| 4-(2-Cyanoethoxy)butyl acrylate | 88.5 | 88.8 | — | — | — | — |
| 3-(2-Cyanoethoxy)propyl acrylate | — | — | 88.5 | 88.9 | — | — |
| 2-[2-(2-Cyanoethoxy)ethoxy]ethyl acrylate | — | — | — | — | 88.6 | 88.9 |
| Acrylonitrile | 11.5 | — | 11.5 | — | 11.4 | — |
| Methacrylonitrile | — | 11.2 | — | 11.1 | — | 11.1 |
| Mooney viscosity $ML_{1+4}$ (100° C.) | 26 | 29 | 27 | 26 | 27 | 28 |
| Evaluation results | | | | | | |
| Physical properties of vulcanized rubber | | | | | | |
| Hardness (JIS-A) | 60 | 61 | 59 | 63 | 57 | 56 |
| Tensile strength (kg/cm²) | 114 | 117 | 112 | 114 | 110 | 108 |
| Breaking elongation (%) | 210 | 220 | 210 | 230 | 210 | 240 |
| 100% modulus (kg/cm²) | 60 | 61 | 63 | 59 | 56 | 57 |

TABLE 5-continued

|  | Example 26 | Example 27 | Example 28 | Example 29 | Example 31 | Example 31 |
|---|---|---|---|---|---|---|
| Fuel oil C resistance | | | | | | |
| Volume increase (%) | 16 | 15 | 12 | 12 | 14 | 14 |
| Penetrated amount (g/100 cm² · 9 days) | 1.9 | 1.9 | 1.6 | 1.6 | 1.8 | 1.6 |
| Cold resistance | | | | | | |
| Glass transition temp. (°C.) | −35.9 | −35.6 | −30.8 | −30.5 | −36.6 | −36.8 |

TABLE 6

| Copolymer rubber | 100 parts |
|---|---|
| Stearic acid | 1 |
| Carbon black MAF | 50 |
| Potassium stearate | 0.5 |
| Sodium stearate | 3 |
| Sulfur | 0.3 |

TABLE 7

| Copolymer rubber | 100 parts |
|---|---|
| Stearic acid | 1 |
| Carbon black MAF | 50 |
| Trimercaptotriazine | 0.4 |
| Sodium stearate | 3 |

TABLE 8

| Copolymer rubber | 100 parts |
|---|---|
| Stearic acid | 1 |
| Carbon black MAF | 50 |
| Ammonium benzoate | 1 |

TABLE 9

| Copolymer rubber | 100 parts |
|---|---|
| Stearic acid | 1 |
| Carbon black MAF | 50 |
| 3M-40[1)] | 2 |

[1)]1,1-bis(t-butylperoxy-3,3,5-trimethylcyclohexane

TABLE 10

| Copolymer rubber | 100 parts |
|---|---|
| Stearic acid | 1 |
| Carbon black MAF | 50 |
| 3M-40[1)] | 2.6 |
| Vulnoc PM[2)] | 1.8 |
| Nocrac CD[3)] | 2.0 |

[1)]1,1-bis(t-butylperoxy-3,3,5-trimethylcyclohexane
[2)]N,N-m-phenylenebismaleimide
[3)]4,4-bis(α,α-dimethylbenzyl)diphenylamine

TABLE 11

|  | Comparative Example 2 | Comparative Example 3 | Comparative Example 4 | Comparative Example 5 |
|---|---|---|---|---|
| Type of rubber | Fluorine rubber[1)] | Nitrile rubber[2)] | Hydrogenated nitrile rubber[3)] | Hydrin rubber[4)] |
| Blend composition | | | | |
| Rubber | 100 | 100 | 100 | 100 |
| Stearic acid | — | 1 | 1 | 1 |
| Carbon black MAF | — | 50 | 50 | 50 |
| Carbon black MT | 20 | — | — | — |
| MgO | 3 | — | — | 1.5 |
| Ca(OH)₂ | 6 | — | — | — |
| ZnO | — | 5 | 5 | — |
| Sulfur | — | 1 | 0.5 | — |
| Dibenzothiazoyl disulfide | — | 1 | — | — |
| Tetramethylthiuram disulfide | — | — | 2 | — |
| 2-Mercaptobenzothiazole | — | — | 0.5 | — |
| Calcium carbonate | — | — | — | 5 |
| Trimercaptotriazine | — | — | — | 0.9 |
| Vulcanization conditions | | | | |
| Primary vulcanization (press) | 170° C., 30 min | 160° C., 30 min | 160° C., 20 min | 160° C., 30 min |
| Secondary vulcanization (Geer oven) | 200° C., 24 hr | — | — | 150° C., 4 hr |
| Evaluation results | | | | |
| Physical properties of vulcanized rubber | | | | |
| Hardness (JIS-A) | 73 | 81 | 79 | 78 |
| Tensile strength (kg/cm²) | 150 | 193 | 201 | 168 |
| Breaking elongation (%) | 260 | 380 | 370 | 250 |
| 100% modulus (kg/cm²) | 49 | 51 | 61 | 83 |

TABLE 11-continued

|  | Comparative Example 2 | Comparative Example 3 | Comparative Example 4 | Comparative Example 5 |
|---|---|---|---|---|
| Fuel oil C resistance |  |  |  |  |
| Volume increase (%) | 15 | 42 | 45 | 44 |
| Penetrated amount (g/100 cm² · 9 days) | 0.0 | 15.6 | 17.1 | 17.4 |
| Cold resistance |  |  |  |  |
| Glass transition temp. (°C.) | −21 | −16 | −26 | −45 |

[1] Viton E-60C, manufactured by Du Pont.
[2] Nippol DN105, manufactured by Nippon Zeon Co., Ltd.
[3] Zetpol 1020, manufactured by Nippon Zeon Co., Ltd.
[4] Zecron 2000, manufactured by Nippon Zeon Co., Ltd.

From the foregoing results, it is evident that the present invention presents oil resistant cold and resistant copolymer rubbers having improved fuel oil resistance and mechanical strength.

We claim:

1. A copolymer rubber which consists essentially of
   (A) from 70 to 99 wt % of a cyano group-containing acrylate of the formula (I):

$$CH_2=CH-\underset{\underset{O}{\|}}{C}-O-R^1-O-CH_2CH_2CN \qquad (I)$$

wherein $R^1$ is a $C_{2-6}$ alkylene group or $-CH_2CH_2OCH_2CH_2-$,
   (B) from 1 to 30 wt % of an α,β-unsaturated nitrile,
   (C) from 0.5 wt % to 10 wt % of at least one monomer selected from the following monomers:
      a) an active halogen group-containing monomer
      b) an epoxy group-containing monomer
      c) a carboxyl group-containing monomer
      d) a diene compound
      e) a (meth)acrylate having an ethylenically unsaturated bond in its side chain, and
   (D) from 0 to 15 wt % of other ethylenically unsaturated monomer which is copolymerizable with each of the above components (A), (B) and (C), and
   which has a Mooney viscosity ($ML_{1+4}$ (100° C.)) of at least 5.

2. The copolymer rubber according to claim 1, wherein the α,β-unsaturated nitrile of the above component (B) is acrylonitrile or/and methacrylonitrile.

3. The copolymer rubber according to claim 1, wherein the active halogen group-containing monomer of the above component (C) is vinyl chloroacetate, 2-chloroethyl vinyl ether or 2-chloroethyl acrylate.

4. The copolymer rubber according to claim 1, wherein the epoxy group-containing monomer of the above component (C) is glycidyl methacrylate, glycidyl acrylate or allyl glycidyl ether.

5. The copolymer rubber according to claim 1, wherein the carboxyl group-containing monomer of the above component (C) is acrylic acid or methacrylic acid.

6. The copolymer rubber according to claim 1, wherein the diene compound of the above component (C) is ethylidenenorbornene.

7. The copolymer rubber according to claim 1, wherein the (meth)acrylate having an unsaturated bond in its side chain of the above component (C) is tetrahydrobenzyl (meth)acrylate, dihydrodicyclopentenyl (meth)acrylate or dihydrodicyclopentenyloxyethyl (meth)acrylate.

8. A method for producing a copolymer rubber, which comprises copolymerizing in the presence of a radical initiator a monomer mixture consisting essentially of
   (A) from 70 to 99 % of a cyano group-containing acrylate of the formula (I):

$$CH_2=CH-\underset{\underset{O}{\|}}{C}-O-R^1-O-CH_2CH_2CN \qquad (I)$$

wherein $R^1$ is a $C_{2-6}$ alkylene group or $-CH_2CH_2OCH_2CH_2-$,
   (B) from 1 to 30 wt % of an α,β-unsaturated nitrile,
   (C) from 0.5 wt % to 10 wt % of at least one monomer selected from the following monomers:
      a) an active halogen group-containing monomer
      b) an epoxy group-containing monomer
      c) a carboxyl group-containing monomer
      d) a diene compound
      e) a (meth)acrylate having an ethylenically unsaturated bond in its side chain, and
   (D) from 0 to 15 wt % of other ethylenically unsaturated monomer which is copolymerizable with each of the above components (A), (B) and (C).

9. The copolymer rubber according to claim 1, wherein component (D) is present.

10. The copolymer rubber according to claim 1, wherein the amount of component (C) is 0.5 to 5 wt %.

11. The copolymer rubber according to claim 1, wherein both components (C) and (D) are present.

12. The copolymer rubber according to claim 11, wherein the amount of component (C) is 0.5 to 5 wt %.

13. The method according to claim 8, wherein component (D) is present.

14. The method according to claim 1, wherein the amount of component (C) is 0.5 to 5 wt %.

15. The method according to claim 8, wherein both component (C) and component (D) are present.

16. The method according to claim 15, wherein the amount of component (C) is 0.5 to 5 wt %.

* * * * *